United States Patent [19]

Hsiao et al.

[11] Patent Number: 4,545,490

[45] Date of Patent: Oct. 8, 1985

[54] SAFETY STEEL ANGLE ASSEMBLY RACK

[76] Inventors: Yu-Sheng Hsiao, 11th Fl., No. 78, Chang Chun Rd.; Huey-Der Cheng, No. 328, Ho Ping West Rd., Sec. 3, both of Taipei, Taiwan

[21] Appl. No.: 501,157

[22] Filed: Jun. 6, 1983

[51] Int. Cl.[4] ............................................. A47B 47/00
[52] U.S. Cl. .................................... 211/191; 312/140; 211/182
[58] Field of Search ............... 211/191, 194, 183, 182; 403/205, 403, 295, 231, 217, 219; 312/140

[56] References Cited

U.S. PATENT DOCUMENTS

| | | | |
|---|---|---|---|
| 2,861,659 | 11/1958 | Hagerty | 403/231 |
| 3,339,750 | 9/1967 | Nelson-Hawkins | 211/182 X |
| 3,914,062 | 10/1975 | Heininger | |
| 4,078,847 | 3/1978 | Presnick | 312/140 |
| 4,148,263 | 4/1979 | Suttles | |
| 4,196,952 | 4/1980 | Crowe | 312/140 X |
| 4,303,289 | 12/1981 | Hardy | 312/140 X |
| 4,347,015 | 8/1982 | Olashaw | 403/219 |

*Primary Examiner*—Ramon S. Britts
*Assistant Examiner*—Sarah A. Lechok
*Attorney, Agent, or Firm*—Brumbaugh, Graves, Donohue & Raymond

[57] ABSTRACT

An assembly rack having: a plurality of steel angles each having its two sides bent into L-shaped guide edges which define a guide groove, and provided with a series of holes in each side, and a plurality of slightly L-shaped joint members of sheet metal having a guide groove on each side and provided with screw holes one in each side of the guide groove. The guide edges of the steel angles are engaged in the grooves of the joint members and the two extended portions of the joint members are fitted into the guide grooves of the angles. Vertical and horizontal steel angles thus joined by the joint members are fastened to the joint members by bolts, and the horizontal angles can be positioned at different locations along the vertical steel angles.

6 Claims, 8 Drawing Figures

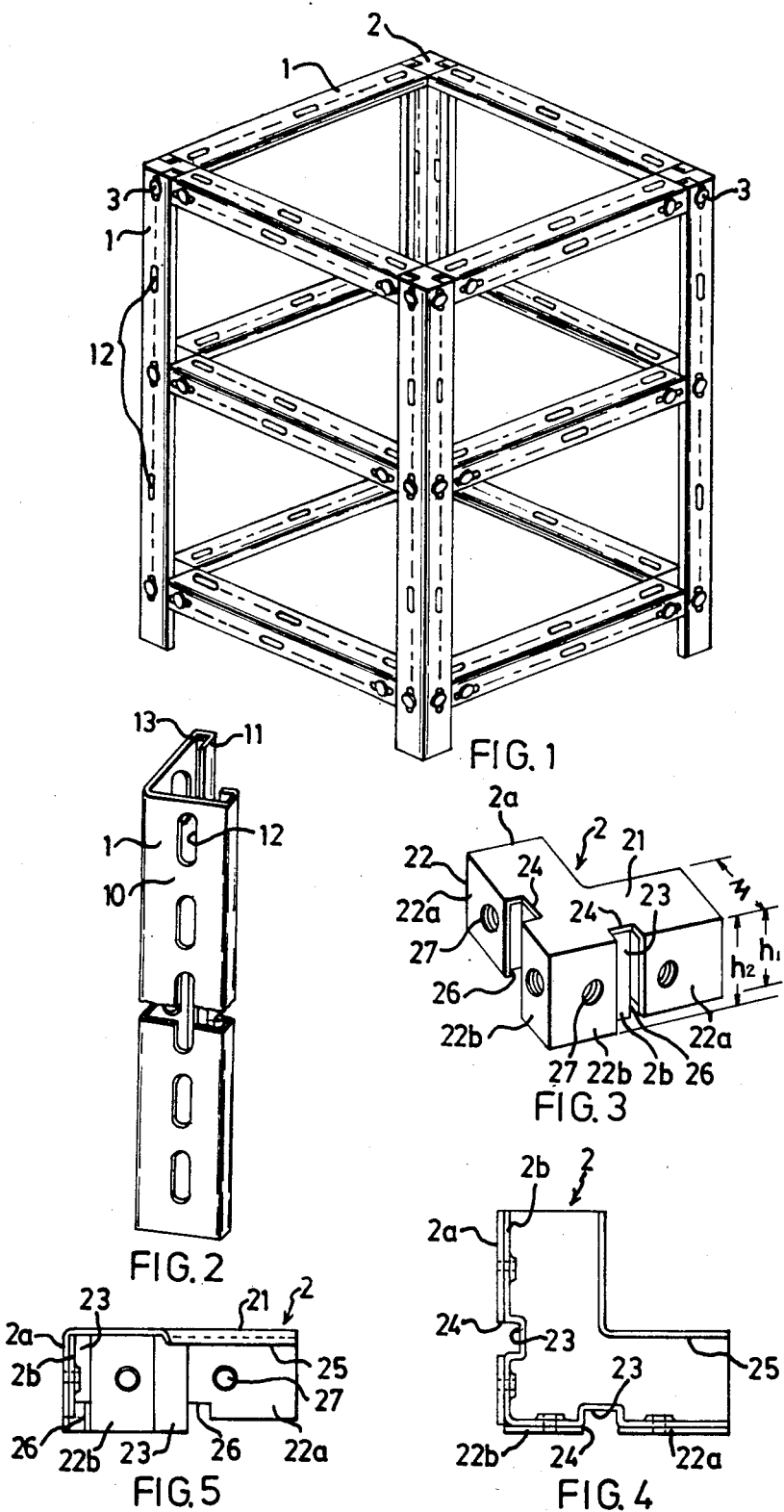

ly "SAFETY STEEL ANGLE ASSEMBLY RACK

BACKGROUND

The present invention relates to safety steel angle assembly racks and its members, and more particularly, to a steel angle assembly rack composed of a plurality of angles with sides bent into guide edges and with long holes, and a plurality of joint members with screw holes and guide grooves in which said angles are adapted to fit.

Conventional L-shaped angles are characterized as being easily assembled and disassembled, and are used widely in offices, godowns (i.e., warehouses) and homes. However, these kinds of angles have sharp-edged sides and therefore tend to cause cuts in hands or clothes during transport and storage. Moreover, this type of angles with diminutive sectional area, weakness in construction, and less loading capacity is not up to expectation as far as safety in use and strength are concerned. Furthermore, when assembling, the angles have to be held firm by bolts and nuts, hence are lacking stability in the joints and adjustability of the horizontal shelves thereon in relation to the vertical supports.

Currently, one kind of assembly rack available on the market consists of circular or square metal pipes without sharp edges fitted together has solid multi-branch joints. It is safe in use and with more loading capacity on account of its absence of sharp edges, larger sectional area, and closed form. But this type of assembly rack is not entirely satisfactory, because of the high cost of the pipes and joints. Besides, a variety of joints have to be used in assembly, thus restricting its flexibility in use. Still, the assembly can not be adjusted even in a simple way. Still further, with multiple shelves on the rack, instead of single pipes, many pieces of pipes with joints of each section being interconnected are used. Hence structural strength and stability is reduced, and during disassembly the openings of the pipes fitting around the joints often become enlarged, thus rendering the pipes unusable for reassembly. Even when re-used in assembly, the whole assembly rack becomes unstable because the joint portions become loose.

SUMMARY OF THE INVENTION

It is an object of this invention to provide an all-purpose steel angle assembly rack and its members, which can be mechanically adjusted during assembly and disassembly, and which can provide better strength and stability.

Another object of the invention is to provide a kind of safety angle having its two sides bent inwardly to form L-shaped guide edges, which not only provides greater structural strength and loading capacity, but also ensures safety in assembly, transporting and use.

A further object of the present invention is to provide low-cost and high strength safety steel angles and joint members, which can be utilized repeatedly without affecting the strength and firmness of the structure and of the assembled rack.

BRIEF DESCRIPTION OF THE DRAWINGS

These and other objects, features and advantages of the invention will be apparent from the following description by reference to the accompanying drawings wherein:

FIG. 1 is a perspective view of a preferred embodiment of an assembly rack in accordance with the present invention;

FIG. 2 is a perspective view of a safety steel angle made pursuant to the present invention;

FIG. 3 is a perspective view of a joint member for use in the steel angle shown in FIG. 2;

FIG. 4 is a bottom view of the joint member shown in FIG. 3;

FIG. 5 is a side view of the joint member shown in FIG. 3;

DETAILED DESCRIPTION OF THE PREFERRED EMBODIMENTS

Figure 6:
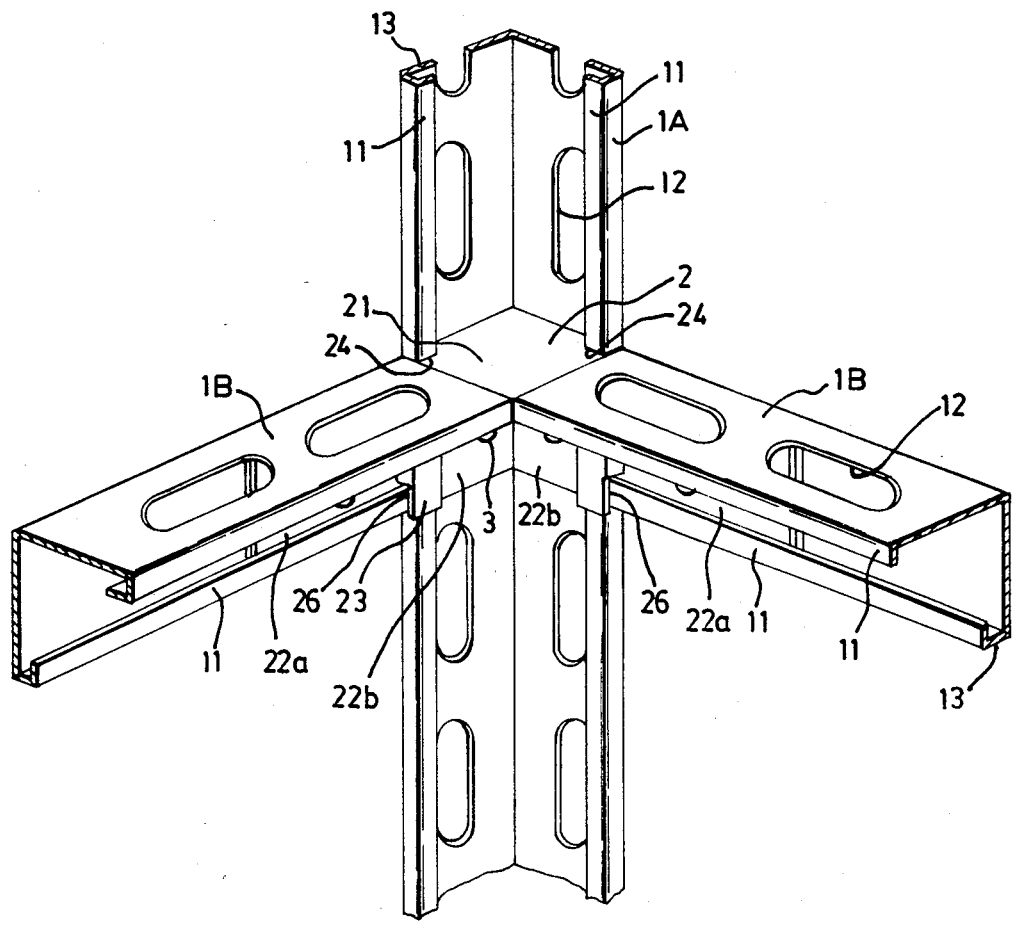
FIG. 6 is a perspective view of the main portion of the assembly rack according to the invention.

Referring to FIG. 1, there is illustrated an embodiment in the form of an assembly rack as disclosed in the present application. The assembly comprises a plurality of safety steel angles 1 which are generally L-shaped in cross section and are interconnected transversely and longitudinally by means of a plurality of joint members 2 and bolts 3, and are arranged in a multi-tier rack.

With reference now to FIG. 2, there is shown an L-shaped steel angle comprising two longitudinally extending parallel guide edges 11 being formed by the two side edges each bent inward perpendicularly twice. More specifically, an L-shaped steel angle is formed in accordance with the invention. The two perpendicularly connected surfaces referred to as 10 have each along its center at least one longitudinal row of equidistantly spaced holes 12 which are disposed in corresponding position on both sides. The guide edges 11 and the angle main body 1 define therebetween two guide grooves 13.

Referring now to FIGS. 3 to 5 of the drawings, there is illustrated a joint member 2 comprising a body 2a and an inner plate 2b. The body 2a is formed by pressing a metal plate into an L-shaped top surface 21 and two sidewalls 22 hanging down from the longer outer edge of the top surface 21. The inner plate 2b is attached by spot welding to the inner surfaces of the two sidewalls 22 of the body 2a and is L-shaped with a channel-shaped guide groove 23 on each side. Each sidewall 22 of said joint member 2 has a guide opening near its center, which extends to the top surface 21 and divides each sidewall 22 into two parts, 22a and 22b. The outer part 22a of each sidewall 22, which is external to the guide opening 24, has a height $h_1$ shorter than the height $h_2$ of the inner part 22b, but is equal to the width w of the top surface such that the steel angle 1 can fit into it. The outer side of the body 2a (i.e. the shorter inner side) is absent of sidewall 22, and is curved inward along its edge to form a flange 25. The breadth of the curve of this flange 25 is slightly lesser than that of the guide grooves 13 formed in the afore-said steel angle 1, so that it can fit freely in the guide grooves 13 of the angle 1. The two guide grooves 23 formed on the inner plate 2b coincide with the guide openings 24 found on the body 2a. Further, on the lower part of that sidewall of each engaging groove 23 which is contiguous to the afore-said outer part 22a there is a notch 26, which enables one end of the horizontal steel angle 1 that is fitted into the outer part 22a to abut the guide edge 11 of the vertical angle 1 which, in turn, fits into the inner part 22b. Screw holes 27 are provided, one in each inner part 22b and outer part 22a of the sidewall 22, and also in the inner plate 26, so that bolts can be passed therethrough to fasten together the joint member and steel angles.

Figure 8:
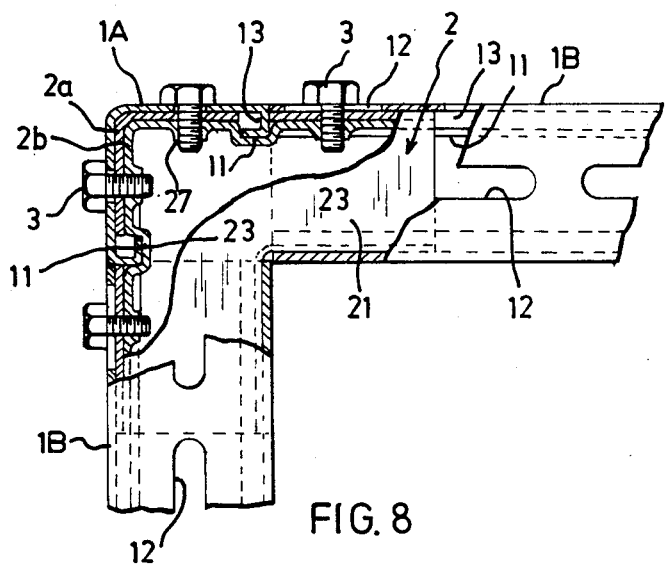
FIG. 8 is a transverse sectional view of the main portion of the assembly rack according to the invention.
Figure 7:
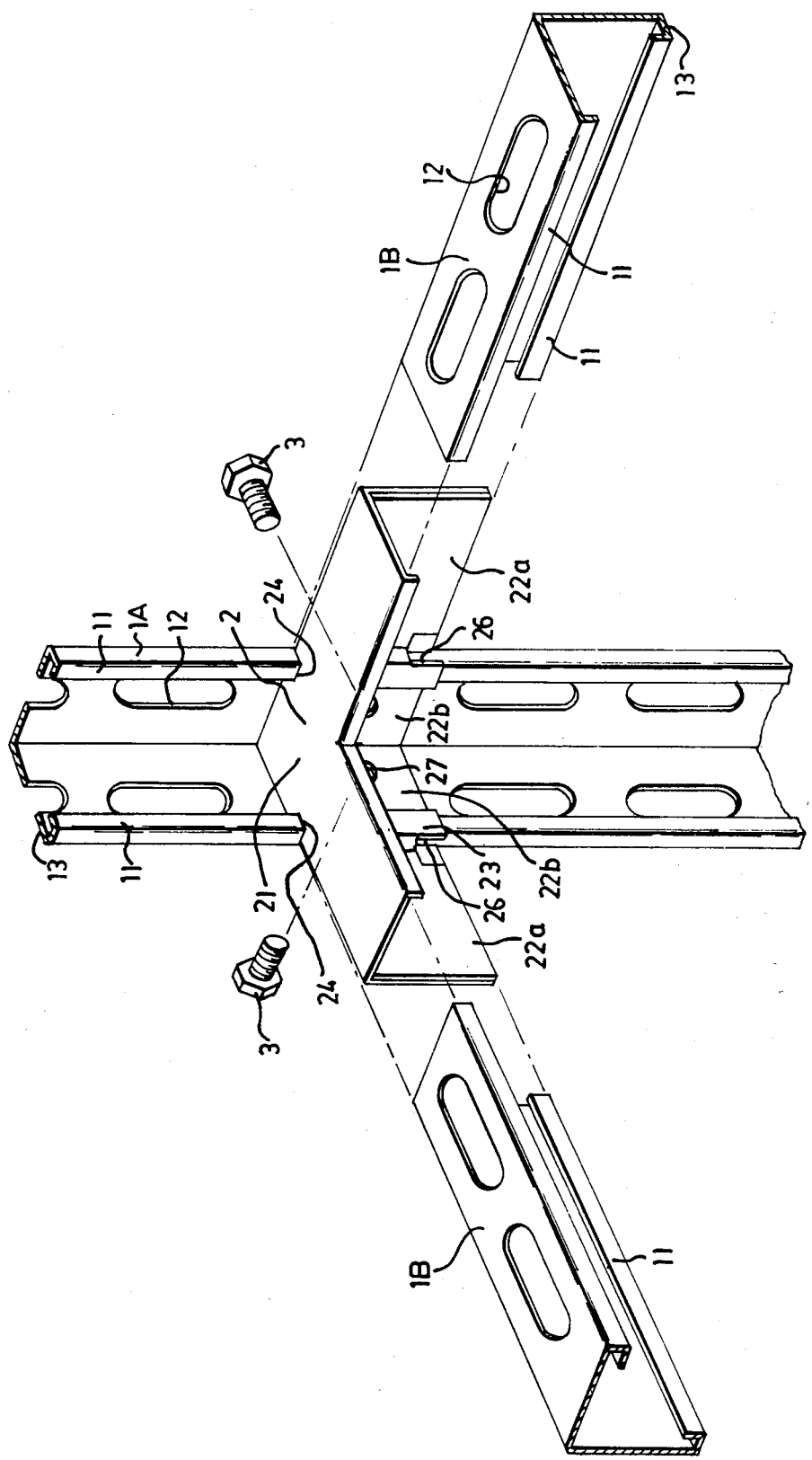
FIG. 7 is a perspective view of a preferred embodiment of a disassembled rack in accordance with the present invention as shown in FIG. 6.

Referring further to FIGS. 1, 6 and 8, the assembly comprises essentially the steel angle 1, joint member 2 and bolt 3 according to the present invention. In assemblying, a plurality of steel angles 1A as vertical supports and a plurality of steel angles 1B as horizontal joining rods are used, and a required number of joint members 2 are mounted by the inner parts 2b and engaging grooves 23 on the internal side and guide edges respectively of the steel angle 1A. The joint members are fastened firmly in predetermined position on the steel angle 1A by passing bolts 3 through holes 12 in the steel angle 1A and the screw holes 27 in the joint member 2. The two ends of the angle 1B are then mounted on the vertical supports with its two guide grooves engaged in the lower end of the outer part 22a and the flange 25 of the top surface 21. The engaging arrangement of the angle on the outer part 22a of the joint member with that on the top surface 21 forms an L-shaped fit-in joint. All of which are then fastened with bolts. In this way a multi-tier rack is assembled by attaching horizontal steel angles 1B to the joint members 2 from below upward or vice versa in an orderly manner so that each vertical steel angle 1A and the horizontal steel angle 1B are interconnected.

It will be appreciated from the foregoing that the present invention represents a significant advance in the assembly rack art, especially as applied in safety, loading capacity, firmness and cost. The two edges of the steel angle are bent inward, and thus become smooth guide edges. These will not cause cuts in hands or clothes during assembly or transport. Moreover, these guide edges increase the sectional area and strength of the steel angles and enhance the loading capacity. Under same loading stress, the steel angles according to the present invention can be made of thinner or shorter material than the conventional ones can. Manufacture of the steel angles and joint members is made simpler, hence lowering the cost. At the same time, single steel angles can be utilized as the vertical supports to provide better strength and safety. The frame assembled with horizontal steel angles can be adjusted freely along the vertical steel angles by virtue of joint members. Again, this makes for simpler, more convenient assembly work. There will be no deformation in all parts during disassembly and the steel angles and joints can be re-used again and again.

Although the invention has been described in detail with reference to its presently preferred embodiment, it will be understood by one of ordinary skill in the art that various modifications can be made without departing from the spirit and scope of the invention. Accordingly, it is not intended that the invention be limited, except as by the appended claims.

We claim:

1. An assembly rack comprising a plurality of steel angles used as vertical supports and horizontal joining rods interconnected transversely and longitudinally by a plurality of L-shaped joint members and bolts, each of the steel angles having two L-shaped perpendicular sides, each side being bent inward along its longitudinal plane to form small L-shaped guide edges defining an inner guide groove and each side having at least one row of spaced holes arranged longitudinally along the surface thereof, each of said joint members having an L-shaped surface and two interconnected sidewalls hanging down from the longer outer edge of the L-shaped top surface, each sidewall having a guide opening extending from the top surface to the lower edge of the sidewall which divides the sidewall into inner and outer parts, and a screw hole in each of the inner and outer parts of the sidewall.

2. An assembly rack as defined in claim 1, wherein said vertical support is a single steel angle.

3. An assembly rack as defined in claim 1, wherein said joint member further includes a plurality of notches in said top surface, each notch being a continuation of one of the guide openings, and an L-shaped inner plate attached by spot welding to the inner side of each sidewall of the joint member, said inner plate having on each side a channel-shaped guide groove which coincides with the guide opening, and having screw holes passing therethrough aligned with the screw holes passing through each part of the sidewalls.

4. An assembly rack as defined in claims 1 or 3, wherein the height of the outer part of each sidewall of the joint member is shorter than that of the inner part and is substantially equal to the width of the top surface.

5. An assembly rack as defined in claim 3, wherein a notch is formed at the lower end of that sidewall of each channel-shaped guide groove adjacent to the otuer part of each sidewall of the joint member.

6. An assembly rack as defined in claim 3, wherein a downward bent flange is formed along the shorter inner edge of the L-shaped top surface where no sidewall is formed, the width of the flange being slightly shorter than the width of the guide groove defined by each guide edge of said steel angle.

* * * * *

UNITED STATES PATENT AND TRADEMARK OFFICE
CERTIFICATE OF CORRECTION

PATENT NO. : 4,545,490

DATED : Oct. 8, 1985

INVENTOR(S) : Hsiao et al.

It is certified that error appears in the above-identified patent and that said Letters Patent is hereby corrected as shown below:

Column 1, line 4, delete the heading "BACKGROUND" and insert it between lines 12 and 13 of column 1.

Column 1, line 28, "has" should read --with--.
Column 1, line 29, "with" should read --has--.
Column 4, line 44, "otuer" should read --outer--.

Signed and Sealed this

Twentieth Day of May 1986

[SEAL]

Attest:

DONALD J. QUIGG

Attesting Officer     Commissioner of Patents and Trademarks